(12) United States Patent
Chen et al.

(10) Patent No.: US 10,397,522 B2
(45) Date of Patent: Aug. 27, 2019

(54) IDENTIFYING POPULAR NETWORK VIDEO SEGMENTS

(71) Applicant: INTERNATIONAL BUSINESS MACHINES CORPORATION, Armonk, NY (US)

(72) Inventors: Yan Chen, Beijing (CN); Jian Hui He, Beijing (CN); Zhi Hua Pan, Beijing (CN); Zhong Su, Beijing (CN); Xiao Xun Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/676,034

(22) Filed: Aug. 14, 2017

(65) Prior Publication Data

US 2018/0013983 A1    Jan. 11, 2018

Related U.S. Application Data

(63) Continuation of application No. 13/512,708, filed as application No. PCT/EP2010/067920 on Nov. 22, 2010, now Pat. No. 9,736,432.

(30) Foreign Application Priority Data

Nov. 30, 2009    (CN) .......................... 2009 1 0225839

(51) Int. Cl.
*H04N 7/173*    (2011.01)
*H04N 21/4788*    (2011.01)
(Continued)

(52) U.S. Cl.
CPC ..... *H04N 7/17318* (2013.01); *H04N 7/17327* (2013.01); *H04N 21/25891* (2013.01);
(Continued)

(58) Field of Classification Search
None
See application file for complete search history.

(56) References Cited

U.S. PATENT DOCUMENTS 6,545,669 B1    4/2003    Kinawi et al.
7,890,648 B2 *    2/2011    Gould ...................... H04N 5/76
                                                        382/254
(Continued)

FOREIGN PATENT DOCUMENTS

CN    101018364 A    8/2007
CN    101079724 A    11/2007
(Continued)

OTHER PUBLICATIONS

WIPO Appln. PCT/EP2010/067920 International Search Report, dated Mar. 2, 2011, 4 pg.
(Continued)

*Primary Examiner* — Hung Q Dang
(74) *Attorney, Agent, or Firm* — Cuenot, Forsythe & Kim, LLC

(57) ABSTRACT

A method for identifying popular segments of a network video comprising: receiving video player operation information for a plurality of video players operated by users accessing the network video; evaluating a popularity measure for one or more segments of the network-video using the received operation information so as to identify popular segments of the network video.

17 Claims, 8 Drawing Sheets

(51) Int. Cl.
  *H04N 21/258*    (2011.01)
  *H04N 21/84*     (2011.01)
  *H04N 21/442*    (2011.01)
  *H04N 21/845*    (2011.01)
  *H04N 21/658*    (2011.01)
  *H04N 21/472*    (2011.01)

(52) U.S. Cl.
  CPC ... *H04N 21/44222* (2013.01); *H04N 21/4788* (2013.01); *H04N 21/47202* (2013.01); *H04N 21/6582* (2013.01); *H04N 21/84* (2013.01); *H04N 21/8456* (2013.01)

(56) References Cited

U.S. PATENT DOCUMENTS

| | | | |
|---|---|---|---|
| 9,736,432 | B2 | 8/2017 | Chen et al. |
| 2002/0083459 | A1 | 6/2002 | Kondo et al. |
| 2002/0106623 | A1 | 8/2002 | Moehrle |
| 2002/0199186 | A1 | 12/2002 | Ali et al. |
| 2003/0093790 | A1 | 5/2003 | Logan et al. |
| 2003/0140148 | A1 | 7/2003 | Kondo et al. |
| 2003/0222917 | A1 | 12/2003 | Trantow |
| 2005/0030255 | A1 | 2/2005 | Chiu et al. |
| 2005/0154987 | A1* | 7/2005 | Otsuka ............. G11B 27/28 715/716 |
| 2005/0163481 | A1 | 7/2005 | Hirai |
| 2005/0198570 | A1* | 9/2005 | Otsuka ............. G11B 27/28 715/201 |
| 2007/0154190 | A1* | 7/2007 | Gilley ........... G06F 17/30796 386/241 |
| 2007/0219859 | A1 | 9/2007 | Huntington |
| 2007/0280636 | A1 | 12/2007 | Adachi |
| 2008/0133342 | A1 | 6/2008 | Criou et al. |
| 2009/0259632 | A1 | 10/2009 | Singh |
| 2010/0146531 | A1 | 6/2010 | Fu et al. |
| 2010/0153984 | A1* | 6/2010 | Neufeld ............ H04H 20/103 725/14 |
| 2010/0229086 | A1 | 9/2010 | Howell et al. |
| 2010/0235878 | A1 | 9/2010 | Lim et al. |
| 2010/0287475 | A1* | 11/2010 | van Zwol .......... G06F 3/04817 715/723 |
| 2011/0145726 | A1* | 6/2011 | Wei .............. G06F 17/30796 715/752 |
| 2012/0237183 | A1 | 9/2012 | Chen et al. |

FOREIGN PATENT DOCUMENTS

| | | |
|---|---|---|
| CN | 101197925 A | 6/2008 |
| CN | 101291425 A | 10/2008 |
| CN | 101426101 A | 5/2009 |
| CN | 102487456 A | 6/2015 |
| JP | 2003339040 A | 11/2003 |
| KR | 20050051125 A | 6/2005 |
| WO | 2007128003 A2 | 11/2007 |
| WO | 2011064168 A1 | 6/2011 |

OTHER PUBLICATIONS

U.S. Appl. No. 13/512,708, Non-Final Office Action, dated Jul. 31, 2013, 12 pg.
U.S. Appl. No. 13/512,708, Final Office Action, dated Nov. 7, 2013, 13 pg.
U.S. Appl. No. 13/512,708, Advisory Action, dated Jan. 17, 2014, 3 pg.
U.S. Appl. No. 13/512,708, Non-Final Office Action, dated Jul. 22, 2014, 14 pg.
U.S. Appl. No. 13/512,708, Final Office Action, dated Dec. 24, 2014, 18 pg.
U.S. Appl. No. 13/512,708, Examiner's Answer to Appeal Brief, Sep. 15, 2015, 20 pg.
U.S. Appl. No. 13/512,708, Decision on Appeal, Jan. 17, 2017, 6 pg.
U.S. Appl. No. 13/512,708, Notice of Allowance, dated Apr. 7, 2017, 5 pg.

* cited by examiner

IDENTIFYING POPULAR NETWORK VIDEO SEGMENTS

CROSS-REFERENCE TO RELATED APPLICATIONS

This application a Continuation Application of U.S. application Ser. No. 13/512,708, which is the national stage of PCT/EP2010/067920 filed 22 Nov. 2010, designating, inter alia, the United States and claiming priority to Chinese Patent Application No. 200910225839.4 filed 30 Nov. 2009, each of which is hereby incorporated by reference.

BACKGROUND

With the increasing popularity of the internet it is increasingly common for users to view media content such as video on distributed networks. For example, network video can be viewed on the web through services such as YouTube (YouTube is a Trademark of Google, Inc.). However, with increasing quantities of video content becoming available on networks users find it difficult to enjoy a network video in its entirety due to time constraints. It is therefore desirable to effectively and accurately locate most interesting parts of a video, that is portions of a video that are interesting to many people, allowing increased accessibility to the video content within the time constraints of many users.

In practice, interesting portions of video can be identified manually and video can be manually edited, presented or arranged for users in advance. With the continuous growth of the amount of video however, making editing and arranging video in this way requires significant manual effort and nonetheless suffers from the significant disadvantage that a determination of which portions are "interesting" is subjective, on the personal preferences and interests of the editor or arranger.

Automated editing technology also exists that can be used to reduce the overall quantity of video, such as by compaction or other reduction. Such technology implemented using computer video processing techniques may provide users with shorter versions of video content for consumption in reduced period of time, retaining key portions of an original video. In general there are two kinds of such automated editing technology: dynamic video summary which involves temporarily arranging some key scenes; and static video summary which is a representation generated by the key frames within some important scenes. However, using either of these techniques it is necessary to process video metadata using a video analysis method, leading to a large amount of computing which nonetheless may fail to reflect the interests of the ultimate audience.

BRIEF SUMMARY

An embodiment of the present invention accordingly provides, in a first aspect, a method for identifying popular segments of a network video comprising: receiving video player operation information for a plurality of video players operated by users accessing the network video; evaluating a popularity measure for one or more segments of the network-video using the received operation information so as to identify popular segments of the network video.

Another embodiment of the present invention accordingly provides, in a second aspect, an apparatus for identifying popular segments of a network video comprising: a receiver component for receiving video player operation information for a plurality of video players operated by users accessing the network video; an evaluation component for evaluating a popularity measure for one or more segments of the network-video using the received operation information so as to identify popular segments of the network video.

Another embodiment of the present invention accordingly provides, in a third aspect, a computer program comprising computer program code stored on a computer readable medium to, when loaded into a computer system and executed thereon, cause said computer system to perform all the steps of a method described above.

BRIEF DESCRIPTION OF THE SEVERAL VIEWS OF THE DRAWINGS

Preferred embodiments of the present invention will now be described, by way of example only, with reference to the following drawings in which.

DETAILED DESCRIPTION

Embodiments of the present invention provide a simple and effective technique for providing users with access to the most interesting parts of network video. Embodiments of the present invention provide an identification of popular video segments of a network video by using access information from a plurality of video players operated by users accessing the network video. Instead of depending on video analysis techniques or manual selection of video segments, the method uses information deriving from viewers of the network video to determine popularity information for segments of the network video.

Figure 1:
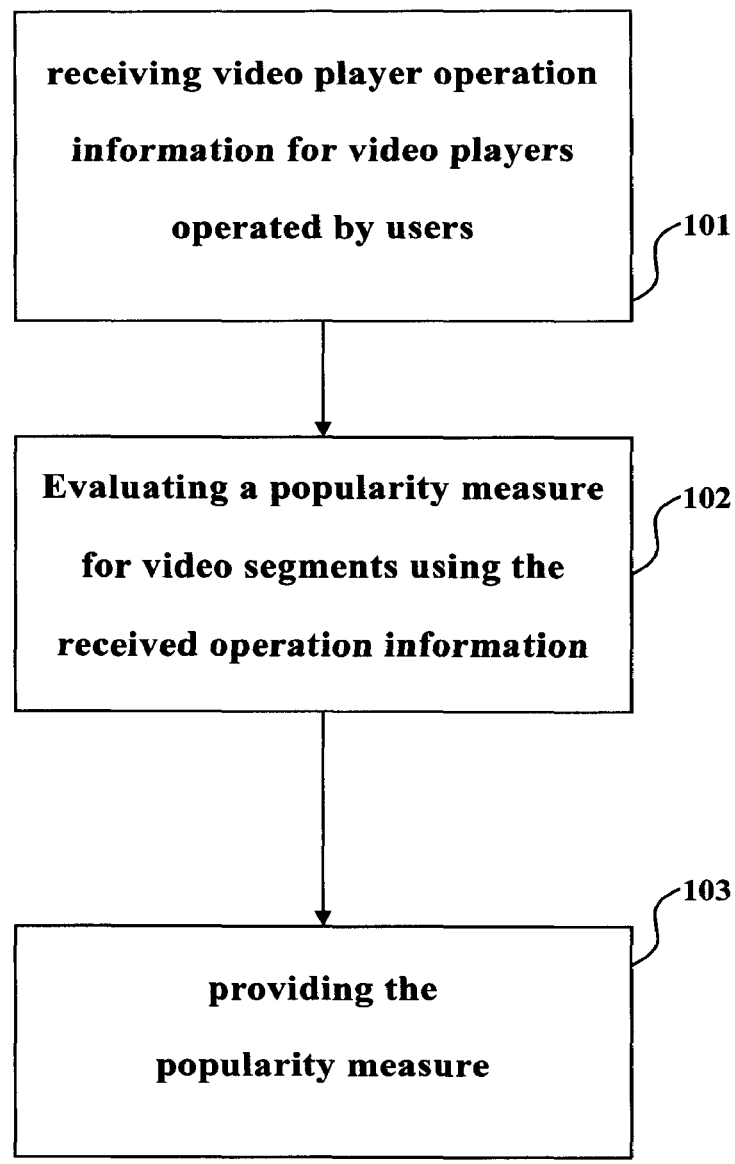
FIG. 1 shows a method for identifying popular segments of a network video according to an embodiment of this invention.

FIG. 1 shows a method for identifying popular segments of a network video according to an embodiment of this invention, the method comprising: at step 101, receiving video player operation information for video players operated by users; at step 102, Evaluating a popularity measure for video segments using the received operation information; and at step 103, providing the popularity measure, such as to a downstream processor for subsequent processing to realize additional advantages of identifying popular segments of the network video.

At step 101, operations taking place on video players with respect to the network video are received from a plurality of users, wherein the operations comprise at least one of scanning forward (such as by a user drag operation to scan forwards through the network video on a playback timebar or similar), drag backward (such as by a user drag operation to scan backwards through the network video on a playback timebar or similar), fast forward (such as by a user selecting a fast forward control), rewind (such as by a user selecting a rewind or fast backward control) and pause (such as by a user selecting a pause, stop or deselecting a play control). Operations on a video player by a user when viewing a network video are communicated to a server by a client device such as a web browser or a computing device having a network video player thereon. In this way, such operations communicated to a server constitute video player operation information reflecting user operation history for the network video. Video player operation information for a single user accessing a network video can be recorded as one sample. Similarly, video player operation information for a plurality of accesses to the network video by the same user can be recorded as a plurality of samples based on a number of accesses. Further, video player operation information for a plurality of accesses to the network video by multiple different users can be recorded, such that the video player operation information is recorded for a plurality of video players operated by users accessing the network video.

At step 102, the operation information is used to evaluate a popularity measure for one or more segments of the network video. In this way, popular segments of the network video are identified based on user operations with a plurality of video players accessing the network video. Operations of scan forward, scan backward, fast forward, rewind and pause can be obtained from the received video player operation information for a plurality of video players.

Specifically, a network video V can be divided into n segments {V1, V2, . . . Vn} in a suitable manner, such as based on content or time. For example, for a video with 10 minutes, a time length of 1 second can be preset for a video segment and the video can be divided into 600 video segments {V0, V1 . . . V600} according to such a predefined time length. A predetermined policy for evaluating popularity of a video segment is defined with reference to operations that can be undertaken by users of video players in viewing a network video. In one embodiment, the predetermined policy is to evaluate a popularity measure as a value for a video segment based on at least one of the following factors: a duration of a scan forward operation in a video segment during viewing by a user; a duration of a scan backward operation in a video segment during viewing by a user; a duration of a rewind operation in a video segment during viewing by a user; a duration of a fast forward operation in a video segment during viewing by a user; and a duration of a pause operation in a video segment during viewing by a user.

The popularity measure for a video segment can be evaluated according to the predetermined policy. For example, in one embodiment the popularity measure R(vi) can be calculated according to the following equation:

$$R_{vi} = \sum_{i=1}^{m} \frac{(-K_A * t_{Ai} + K_B * t_{Bi} - K_C * t_{Ci} + K_D * t_{Di})}{T_{vi}},$$

$$vi \in \{v1, v2, \ldots, vn\}$$

wherein, vi represents a video segment, $T_{vi}$ is the time length of the segment, A represents scan forward, B represents scan backward, C represents fast forward and D represents fast backward, $t_{Ai}$ is a duration of a scan forward operation by an ith user in the segment during a current viewing, $t_{Bi}$ is a duration of a scan backward operation by the ith user in the segment during the current viewing, $t_{Ci}$ is a duration of a fast forward operation by the ith user in the segment during the current viewing, and $t_{Di}$ is a duration of a fast backward operation by the ith user in the segment during the current viewing, and $K_A$, $K_B$, $K_C$ and $K_D$ are weightings for the drag forward, drag backward, fast forward, fast backward operations respectively and m represents a number of the users. If a specific video segment is skipped (such as by scanning forward or dragging forward a time indicator along a time bar) it indicates that the video segment is less popular. If specific video segment is repeated (such as by scanning backwards, rewinding or dragging backward a time indicator along a time bar), it indicates that the video segment is more popular. Hence, scan forward and fast forward have a negative contribution to the popularity measure for a video segment and scan backward and rewind have a positive contribution to the popularity measure for a video segment. Since a user may invoke several repeated or different operations for a segment of a network video during a viewing of the video, such as multiple scan backward and multiple fast forward operations, it is necessary to sum-weight all the operations for a video segment in order to reflect the total contribution of the user's operations to the popularity measure for the video segment.

Such similar operation information from multiple (e.g. tens, hundreds or thousands) of users is collected together and an overall popularity measure for a video segment within a network video can be evaluated. The popularity measure may be positive or negative. In one embodiment, the more positive the measure is the more popular a segment is, and the more negative the measure is, the less popular the segment. Those skilled in the art will appreciate that a predetermined policy according to embodiments of the present invention are merely illustrative and not limiting. Many variations are also possible depending on practical applications and particular user controls available in video players for accessing network video. For example, in video players where network video can be downloaded or stored locally at a viewer's device, the mere playing of a video can be used in a policy to influence a measure of popularity where the video is one of many videos some of which are never played. Similarly, the sharing of network video with other users, such as by an operation involving the communication of a link or identifier of a video to another user, such as by email, can be used in a policy to influence a popularity measure for a video.

Figure 2:
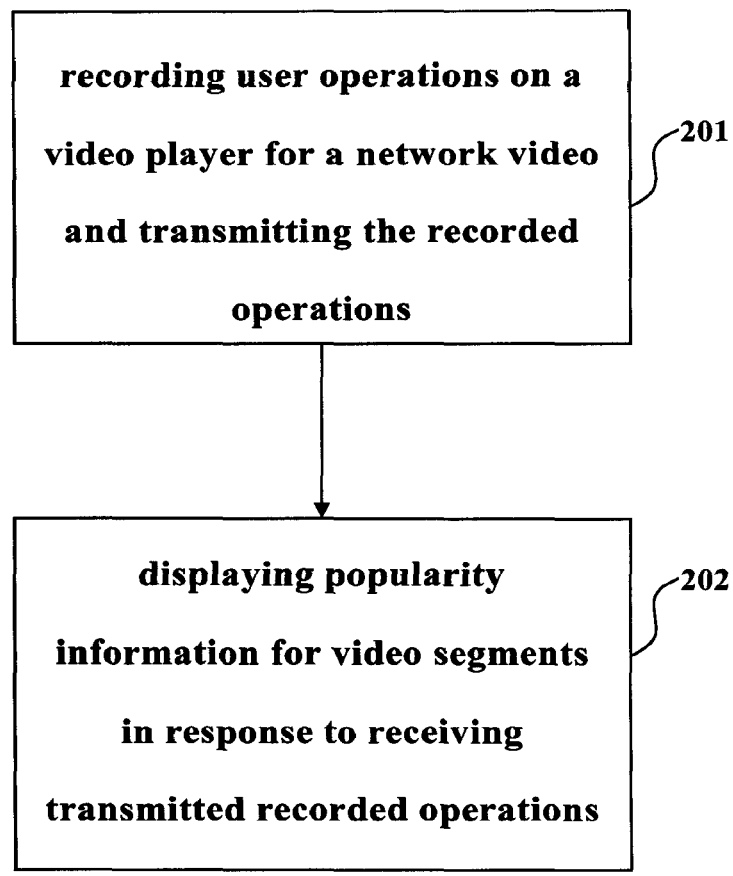
FIG. 2 shows a method for displaying popular segments of a network video according to an embodiment of this invention.

FIG. 2 shows a method for displaying popular segments of a network video according to an embodiment of this invention, the method comprising: at step 201, recording user operations on a video player for a network video and transmitting the recorded operations; and at step 202, displaying popularity information for video segments in response to receiving transmitted recorded operations, wherein the popularity information is acquired by the above described method for identifying popular segments of a network video.

Specifically, operations on a video player by a user during viewing network video can be recorded (although do not necessarily need to be recorded) and transmitted to a server by a client. As in the method of FIG. 1, the server identifies popular segments of a network video as popularity information using operations by multiple users in video players. In response to receiving such popularity information for video segments in a network video, a client is operable to display such information, such as within, alongside or in association with a video player operating on the client device.

Figure 3:
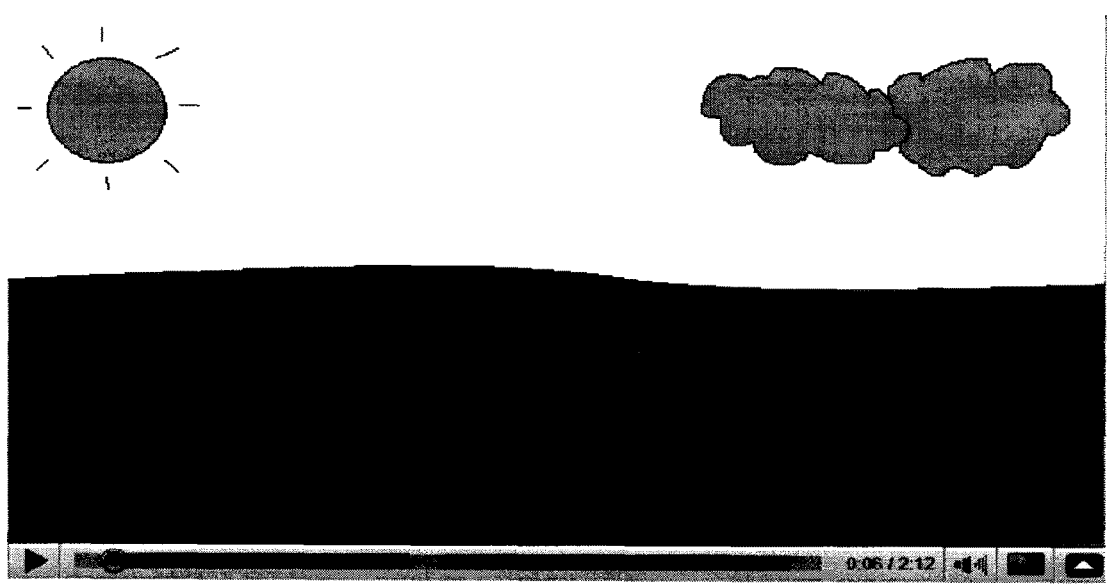
FIG. 3 shows an example of displaying network video popularity information on a network video player according to an embodiment of this invention.

In one embodiment the method for providing network video popularity information comprises displaying popularity information for segments of a network video in response to receiving such information. The displaying may be implemented, for example, on a web video player. In one embodiment, the popularity information is displayed on a progress bar of a video player with color, contrast or brightness variation of the progress bar representing relative changes in popularity for segments of the network video. FIG. 3 shows an example of displaying network video popularity information on a network video player according to an embodiment of this invention where a deeper color represents more popular video segments. A user can readily recognize four most popular regions within the entire network video. In case of limited time, it is possible for a user to drag the slider to the most popular regions of the network video for expedited viewing of the most popular content.

Figure 4:
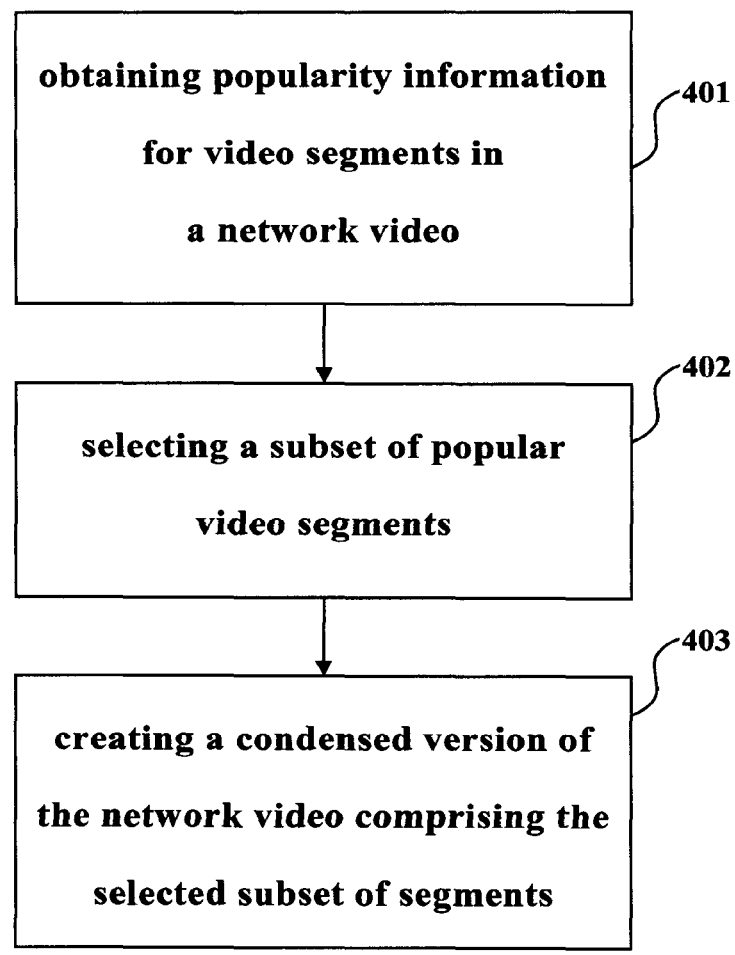
FIG. 4 shows a method for creating a condensed version of a network video according to an embodiment of this invention.

FIG. 4 shows a method for creating a condensed version of a network video according to an embodiment of this invention, the method comprising: at step 401, obtaining popularity information for video segments in a network video; at step 402, selecting a subset of popular video segments; and at step 403, creating a condensed version of the network video comprising the selected subset of segments.

According to one embodiment of this invention, the popularity information for segments of a network video are identified by the method described above with respect to FIG. 1. Subsequently, a series of most popular segments are extracted based on the popularity information including popularity measures for segments in a network video. The extracted segments are used to create a condensed version of the network video containing only the most popular (or salient) parts of the network video. The condensed version of the network video can have a shorter duration compared to the original network video due to the extraction of the most popular segments for inclusion in the condensed version. In one embodiment, the condensed version of the network video is produced according to user defined criteria, such as a particular desired duration, file size, etc.

Figure 5:
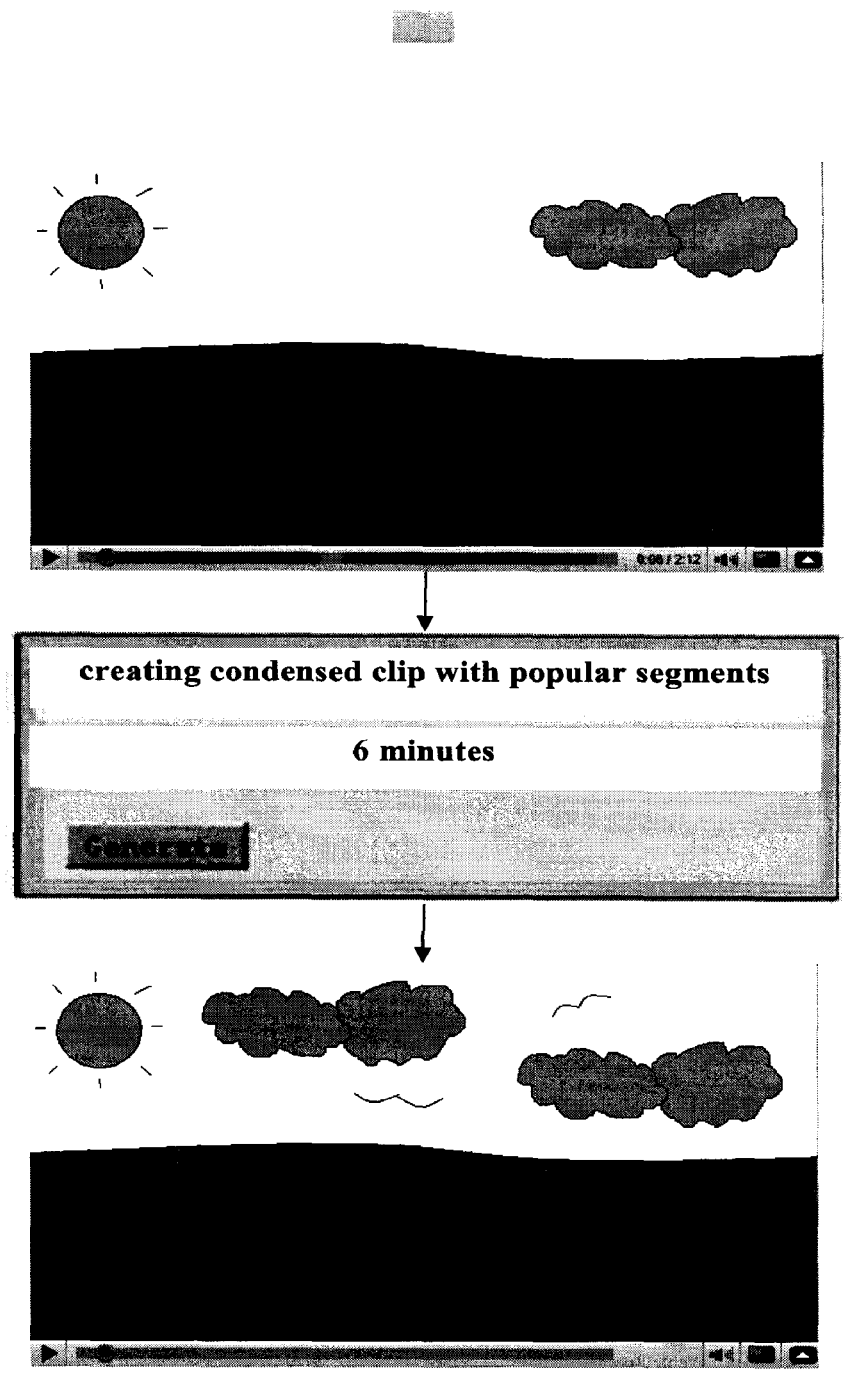
FIG. 5 shows an example of creating a condensed version of a network video according to an embodiment of this invention.

FIG. 5 shows an example of creating a condensed version of a network video according to an embodiment of this invention, wherein a user enters "6 minutes" in the pop-up dialog box for creating a condensed version with most popular segments. In response, a server creates a condensed version of the network video comprising the most popular 6 minutes as the most popular segments totaling 6 minutes in length based on the popularity information and the original network video.

Additionally, to ensure smoothness and continuity of the condensed version of the network video, one or more techniques such as expansion, interpolation, fading, overlaying, video smoothing and transitions can be employed to improve the smoothness, continuity and suitability for viewing of the condensed version of the network video.

Specifically, expansion may first identify one or more most popular video segments based on the popularity information and then extract for use in the condensed version segments with a predetermined length immediately before and after those identified most popular segments in the network video. The predetermined length can be specified by users, such as 3 seconds, 5 seconds or 10 seconds, or can be tapered to correspond to a rate of decrease of popularity of adjacent segments such the length is reduced where adjacent segments have significantly lower measures of popularity. For instance, if a video of 100 minutes is evenly divided into 100 segments {v1, v2, ... v100}, and 6 most popular segments {v10, v25, v40, v60, v75, v95} are extract based on the popularity information, ten-second segments before and after those segments can be extracted respectively to include in the condensed version. With this method, the smoothness and continuity of a certain segment within the clip can be maintained and guaranteed.

It will be noted that the implementation of expansion may further take advantage of the relative time-location of each of a set of most popular segments such that where two popular segments are located close to each other both segments and intermediate segments can be used in the condensed version. Further, it may be desirable to avoid duplication of adjacent 'before' and 'after' segments for popular segments where popular segments are in close proximity. For example, considering popular segments {v10, v30, v32, v60, v80, v82} extracted from a 100 minute network video that is evenly divided into 100 segments {v1, v2, ... v100}, it can be found that v30 and v32, and v82 are in a close proximity temporally. Instead of using segments of 10 seconds before and after each of these popular segments, embodiments may choose to use a shorter period (smaller number of segments) of, say, 5 seconds (or other predetermined threshold) before and after these four video segments for use in the condensed version. Alternatively, all intermediate segments between such proximate popular segments may be used for the condensed version. In this way the duplication of segments included in a condensed version to contextualize and smooth the video can be reduced or eliminated.

Another approach to improve smoothness in the condensed version is interpolation. This approach determines how the popular segments of a network video (based on the popularity information) are distributed temporally across the entire network video. If the popular segments do not have a have a substantially uniform distribution across the entire network video, interpolation can be used to select segments between the popular segments with a very large interval to form a condensed version comprised of more segments. There are two problems when implementing this technique: how to determine whether video segments are distributed uniformly; and how to interpolate between two video segments. As to the first problem, a method can be implemented in which all most popular video segments of the video are extracted at first (e.g. using a threshold popularity definition or relative popularity threshold), and then an average interval between the segments when ordered chronologically can be evaluated. Taking these time intervals as a random variable, the mean $\mu$ and variation $\sigma$ of the random variable are evaluated. As to each time point, it is determined whether there is any popular video segment within the interval $\mu+\sigma$ before and after that point. If no such segment can be found, the most popular segments within $[\mu-\sigma, \mu+\sigma]$ before and after that point can be extracted and are inserted into the previously produced clip as interpolated segments. Next, the same method can be used for a decision as to whether there are any popular video segments before and after each newly inserted segment. Eventually, the interpolation method can achieve an effect as follows: it can be ensured that there must be a popular frame incorporated into the resultant condensed version within $\mu+\sigma$ before and after each of the initial or newly inserted popular segments within the condensed version. Upon interpolation, the resulted condensed version may be further smoothed using the expansion method described above.

An extreme example will be described below to illustrate the benefit of the interpolation method, where it has been found that, within a 100 minute video, for example, all of a group of five most popular segments are initially identified locate in the last half of the video, i.e., the last 50 minutes, with a substantially uniform distribution within the last 50 minutes. In this exemplary scenario there are insufficient segments of sufficient popularity in the first half of the video to make the condensed version smooth and continuous in its content. With interpolation, it can be determined that a mean time interval is 10 minutes and the variation is, say, 5 minutes. According to the interpolation method, five popular segments are added to the condensed version at even distribution taken from the first half of the original network video to make the condensed version smooth, continuous and an appropriate reflection of the original network video.

Those skilled in the art will appreciate that the interpolation and expansion methods can be used separately or in combination, which may further improve the content and continuity of the condensed version. On such a basis, additional video segments can be added and inserted through manual edition to further improve the condensed version as may be required by users or viewers.

Figure 6:
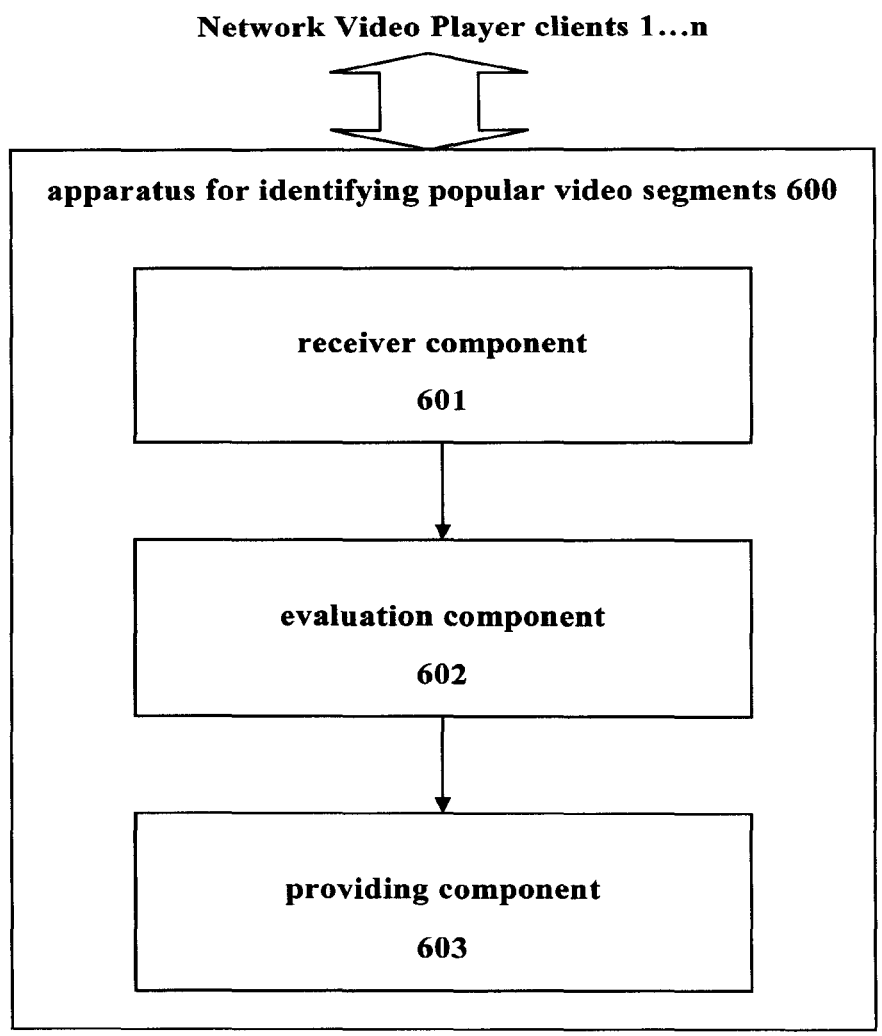
FIG. 6 shows a functional block diagram of an apparatus for identifying popular video segments according to an embodiment of this invention.

FIG. 6 shows a functional block diagram of an apparatus for identifying popular video segments according to an embodiment of this invention, wherein the apparatus 600 for identifying popular video segments: a receiver component 601, configured to receive video player operation information for a plurality of video players operated by users accessing the network video; an evaluation component 602, configured to evaluate a popularity measure for one or more segments of the network video using the received operation information; and an optional providing component 603, configured to provide the popularity information for segments of the network video to downstream processors, wherein the operations at least comprise one of scan forward, scan backward, fast forward, rewind and pause.

In one embodiment, the evaluation component 602 further comprises: a dividing component, configured to divide the network video into multiple video segments; and a popularity evaluator, configured to evaluate the popularity measure for each of the multiple video segments using a predetermined policy defining popularity indicators for the network video, such as those described above. The apparatus for identifying popular video segments in accordance with embodiments of the present invention can be implemented at a server suitable for providing network video, or at a server separate to servers providing network video.

Figure 7:
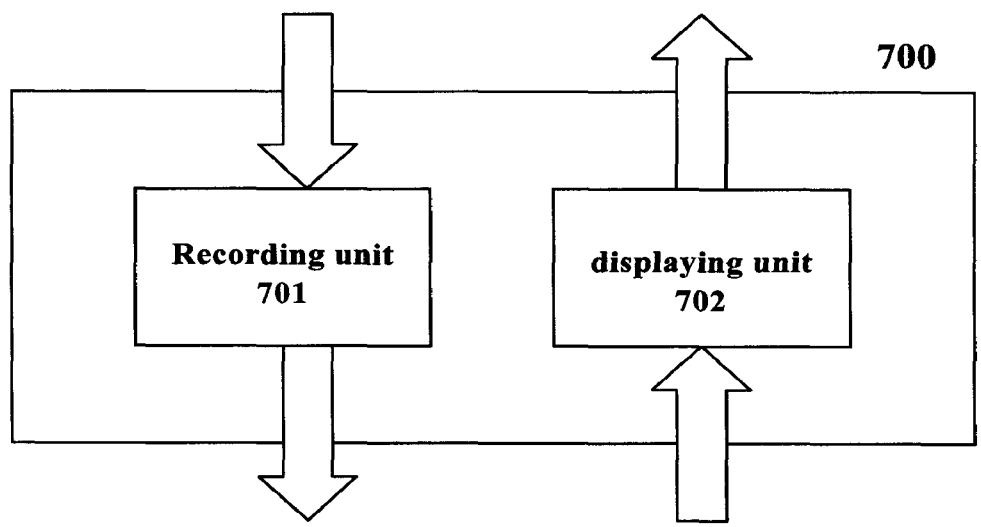
FIG. 7 shows a functional block diagram of an apparatus for assisting provision of network video popularity information according to an embodiment of this invention.

FIG. 7 shows a functional block diagram of an apparatus 700 for assisting provision of network video popularity information according to an embodiment of this invention, wherein the apparatus 700 comprises: a recording unit 701, configured to identify (and optionally record) the operations of a video player in use by a users viewing the network video and transmit the recorded operations; and a display unit 702, configured to display the popularity information for segments of the network video in response to receiving such information, wherein the popularity information is acquired based on the operations of multiple users. The apparatus 700 can be implemented at a network video client such as a web client or other network video software or hardware suitable for operating a video player for viewing network video.

In one embodiment the apparatus 700 for assisting provision of network video popularity information may only comprise the display unit 702, i.e., displaying the popularity information for segments of a network video responsive to the receiving of such information. In this embodiment, the display unit 702 can be implemented, for example, as part of a web video player and further configured to visually display the popularity information within or on the player. Optionally, according to this embodiment, the display unit 702 is further configured to visually display the popularity information on a progress bar of the player, with the variation in color or brightness representing the relative popularity of corresponding video segments, such as is illustrated in FIG. 3.

Figure 8:
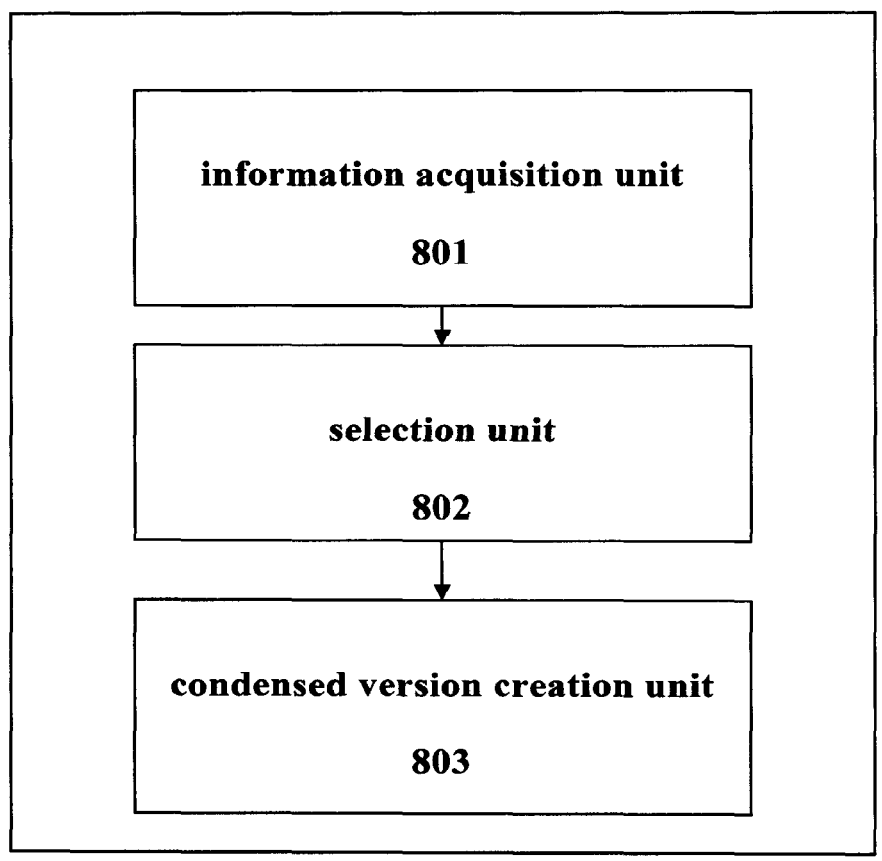
FIG. 8 shows a functional block diagram of a condensing component for creating a condensed version of network video according to an embodiment of this invention.

FIG. 8 shows a functional block diagram of a condensing component 800 for creating a condensed version of network video according to an embodiment of this invention. The condensing component 800 for creating the condensed version comprises: an information acquisition unit 801, configured to acquire the popularity information for segments of a network video; a selection unit 802, configured to select popular video segments of the web video based on the popularity information and some selection criteria (such as predetermined threshold or relative threshold criteria); and a condensed version creation unit 803, configured to create the condensed version of the network video with the selected segments. The popularity information for video segments is obtained based on video player operations of multiple users following the methods and/or principles corresponding to those previously described, and not repeated here.

In one embodiment, a condensed version of the network video is created to satisfy a maximum or defined time length requirement specified by a user, such that the condensed version is of a predetermined length. Such length can be specified by a user having only limited time to view the network video and so requiring the condensed version having the most popular segments configured to fit into a specified time period.

In another embodiment, the content of the condensed version is smoothed with at least one of expansion and interpolation as described above.

The foregoing description of the preferred embodiments of the present invention has been presented for the purpose of illustration. It is not intended to be exhaustive or to limit the embodiments of the invention to the precise forms disclosed. Obvious modifications or variations are possible in light of the above teachings. Such modifications or variations obvious to those skilled in the art are considered to fall within the scope of the present invention defined by the claims appended thereto. The methods described can be implemented using software-controlled programmable processing devices, such as a microprocessor or data processing apparatus.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer-implemented method, comprising:
receiving video player operation information for a plurality of video players operated by users accessing a network video having a plurality of video segments;
evaluating, using a hardware processor and for each of the plurality of video segments, a popularity measure using the received video player operation information; and
creating a condensed version of the network video, wherein
the video player operation information for each of the plurality of video players is information that regards a plurality of media controls being activated during a single playback of the network video by a particular video player,
the plurality of media controls respectively adjust a process of watching the network video by the particular video player,
the condensed version of the network video consists of a subset of video segments of the network video,
the subset of video segments of the network video are based upon the evaluating,
the condensed version of the network video is smoothed by using an expansion method that includes a predetermined length adjacent each of the video segments in the video segments, and
the predetermined length varies depending upon a popularity of adjacent segments.

2. The method of claim 1, wherein
evaluating the popularity measure includes
dividing the network video into the plurality of video segments; and
evaluating the popularity measure for each of the plurality of video segments using a predetermined policy defining popularity indicators for the network video.

3. The method of claim 2, wherein
the predetermined policy includes, as factors for evaluation, the following:
a duration of a scan forward operation;
a duration of a scan backward operation;
a duration of a rewind operation;
a duration of a fast forward operation; and
a duration of a pause operation.

4. The method of claim 2, wherein
popular segments of network video are identified based upon satisfying one or more criteria.

5. The method of claim 1, wherein
the condensed version of the network video is created using a user-defined criteria.

6. The method of claim 1, wherein
the condensed version of the network video is smoothed by using an interpolation method.

7. A computer hardware system, comprising:
a hardware processor configured to initiate the following executable operations:
receiving video player operation information for a plurality of video players operated by users accessing a network video having a plurality of video segments;
evaluating, using a hardware processor and for each of the plurality of video segments, a popularity measure using the received video player operation information; and
creating a condensed version of the network video, wherein
the video player operation information for each of the plurality of video players is information that regards a plurality of media controls being activated during a single playback of the network video by a particular video player,
the plurality of media controls respectively adjust a process of watching the network video by the particular video player,
the condensed version of the network video consists of a subset of video segments of the network video,
the subset of video segments of the network video are based upon the evaluating,
the condensed version of the network video is smoothed by using an expansion method that includes a predetermined length adjacent each of the video segments in the video segments, and
the predetermined length varies depending upon a popularity of adjacent segments.

8. The system of claim 7, wherein
evaluating the popularity measure includes
dividing the network video into the plurality of video segments; and
evaluating the popularity measure for each of the plurality of video segments using a predetermined policy defining popularity indicators for the network video.

9. The system of claim 8, wherein
the predetermined policy includes, as factors for evaluation, the following:
a duration of a scan forward operation;
a duration of a scan backward operation;
a duration of a rewind operation;
a duration of a fast forward operation; and
a duration of a pause operation.

10. The system of claim 8, wherein
popular segments of network video are identified based upon satisfying one or more criteria.

11. The system of claim 7, wherein
the condensed version of the network video is created using a user-defined criteria.

12. The system of claim 7, wherein
the condensed version of the network video is smoothed by an interpolation method.

13. A computer program product, comprising:
a hardware storage device having program code stored therein,
the program code, which when executed by a computer hardware system, causes the computer hardware system to perform:
- receiving video player operation information for a plurality of video players operated by users accessing a network video having a plurality of video segments;
- evaluating, using a hardware processor and for each of the plurality of video segments, a popularity measure using the received video player operation information; and
- creating a condensed version of the network video, wherein the video player operation information for each of the plurality of video players is information that regards a plurality of media controls being activated during a single playback of the network video by a particular video player,
the plurality of media controls respectively adjust a process of watching the network video by the particular video player,
the condensed version of the network video consists of a subset of video segments of the network video,
the subset of video segments of the network video are based upon the evaluating,
the condensed version of the network video is smoothed by using an expansion method that includes a predetermined length adjacent each of the video segments in the video segments, and
the predetermined length varies depending upon a popularity of adjacent segments.

14. The computer program product of claim 13, wherein evaluating the popularity measure includes
- dividing the network video into the plurality of video segments; and
- evaluating the popularity measure for each of the plurality of video segments using a predetermined policy defining popularity indicators for the network video.

15. The computer program product of claim 14, wherein the predetermined policy includes, as factors for evaluation, the following:
- a duration of a scan forward operation;
- a duration of a scan backward operation;
- a duration of a rewind operation;
- a duration of a fast forward operation; and
- a duration of a pause operation.

16. The computer program product of claim 14, wherein popular segments of network video are identified based upon satisfying one or more criteria.

17. The computer program product of claim 13, wherein the condensed version of the network video is created using a user-defined criteria.

* * * * *